Sept. 4, 1951 F. KAY 2,566,769
PIPE COUPLING
Filed July 18, 1949
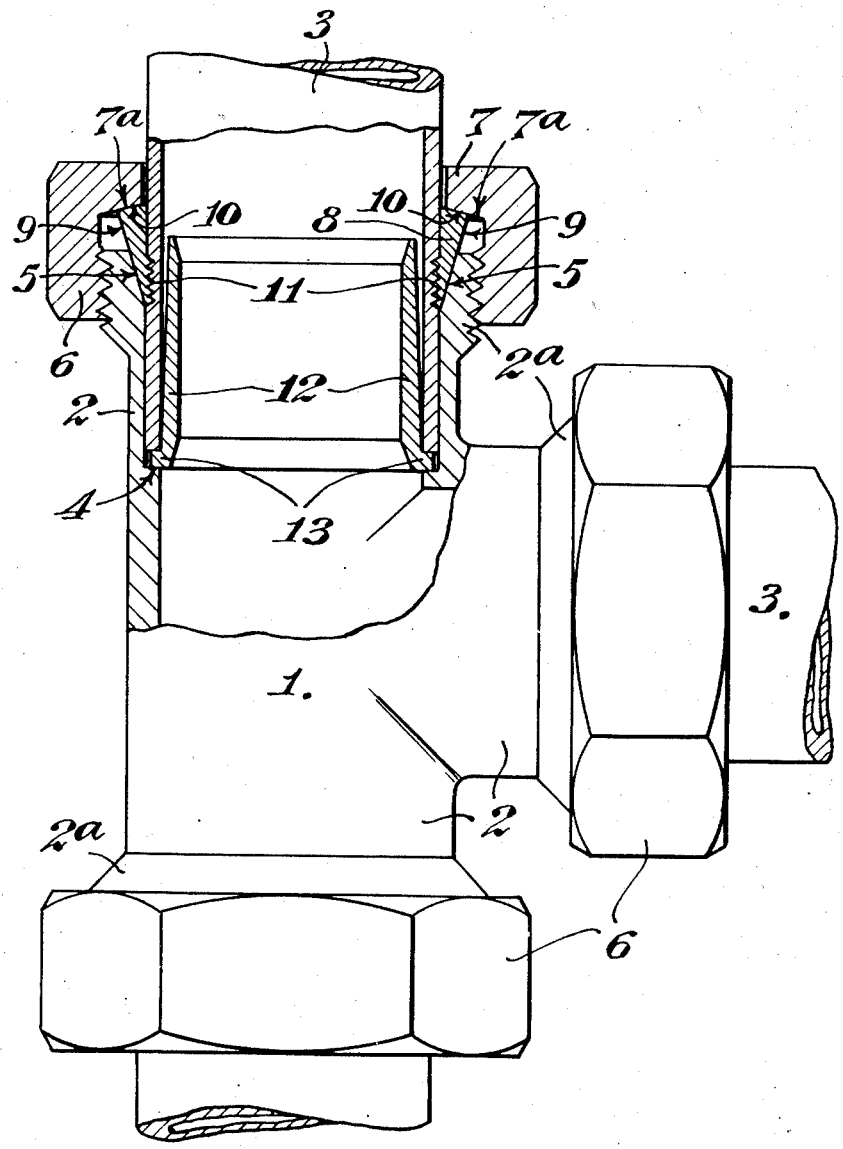
INVENTOR
FRANK KAY Patented Sept. 4, 1951

2,566,769

UNITED STATES PATENT OFFICE 2,566,769

PIPE COUPLING

Frank Kay, Lytham, England

Application July 18, 1949, Serial No. 105,363
In Great Britain February 11, 1949

7 Claims. (Cl. 285—122)

This invention has reference to pipe couplings, that is to say, to means for jointing pipes by the use of a union and coupling nut and relates in particular to couplings or unions of the type wherein a body or union is provided having at least two intercommunicating limbs each to receive therein the end of a pipe, there being provided for each limb a coupling member such as a nut engaging screw threads on the outer surface of the limb, with a wedge like thimble or sealing ring having a cylindrical bore to embrace the pipe end, the tightening up of the nut forcing the thimble or ring into a shaped recess in the end of the limb so that said thimble or ring forms a seal between the pipe and its surrounding part of the union.

It is the primary object of the present invention to provide an improved form of coupling wherein an adequate sealing is obtained thereby enabling the couplings to be operated at high working pressure. A further object is to provide an arrangement wherein the resistance to pulling out of a pipe from the union is increased.

According to the present invention there is provided for use in a pipe coupling of the type set forth, a sealing ring or thimble of metal harder than the metal of the pipe jointed having a tapering outer surface with the coupling constructed so that the thinner end of the thimble is forced into a complementary recess in the union upon the tightening action, wherein the thimble is provided at least at its thinner end and on its inner surface with a number of serrations on and around said surface, the tightening up of the union resulting in the projections formed by the serrations bedding into the embraced pipe surface.

Preferably the serrations are formed by cutting circular V-grooves into the inner surface of the thimble thereby to form circular V-section ridges around the thimble, and the included angle of the ridges is between 60° and 110°.

The present invention may also be said to comprise a pipe coupling or union of the type set forth, wherein each pipe receiving limb has a thickened outer end screw threaded externally to receive an internally screw threaded coupling nut, the bore of said limb being widened towards its end to receive therein the pipe end, the end of the said widened part forming a shoulder for abutment by the pipe end, the wedging member or thimble being formed with a tapering outer surface, and a cylindrical bore, with the end of the limb formed with a complementary recess to receive the thin end of the thimble, the thick or rear end of the said thimble being engaged by the inner surface of an inward circumferential flange on the coupling nut, with the inner surface or bore of the thimble formed with a plurality of circumferentially arranged V-cross section ribs, the tightening up of the coupling nut forcing the thinner thimble end into its recess, causing the said end to grip the outer pipe surface so that the ribs bed into said surface.

In order that a clear understanding of the invention may be obtained, reference will now be made to the accompanying drawing illustrating a preferred embodiment of the invention. The drawing shows in elevation, with a part in section, a T-union embodying the invention, but the invention obviously can equally well be applied to straight, Y or other form of coupling.

The union body 1 has three limbs 2, each limb to receive a pipe has a thickened outer end 2a which is screw threaded externally, and the bore of the limb is widened to receive therein the pipe 3, the inner end of the widened part forming an annular shoulder 4 for pipe abutment. The outer end or mouth 5 of said bore has an outward taper of an angle to conform with the inner angle of taper of the cone, e. g. about 10°–20°. The coupling member comprises a nut 6 internally screw threaded at the one or inner end for mating with the thread on the limb end, and having an inturned circumferential flange 7 at its other end. The outer face of said flange is at a right angle to the axis of the nut whilst the inner face 7a conveniently is at an acute angle of inclination with respect to the outer face, said inner face sloping from its rim or inner end inwardly and towards the inner end of the coupling member.

The cone or thimble 8 has a cylindrical bore, and the outer surface at 9 slopes from its front edge rearwardly at an angle to conform with the outer taper bore 5 of the union. The rear edge 10 of the thimble 8 is cut back at a sharp angle to conform with the taper of the inner surface 7a of the flange. On the bore and to the front thereof, are a number of serrations 11. These are formed as circular V-like projections or rings with an included angle of from between 60° and 100° depending on the size of pipes to be coupled and the pressure to be employed in the pipes. Preferably from four to ten such rings are provided.

In order that resistance to deformation is as great as possible the pipe may have a liner 12 therein. Said liner is thin walled and of an external diameter to fit snugly in the pipe to be coupled with an out-turned flange 13 at its inner end. The liner is firstly inserted in the pipe so that the flange abuts the pipe end, and with the nut and cone on the pipe, the pipe end is inserted in the bore, the flange taking between the shoulder 4 and the pipe end. As the nut is tightened, the cone is forced into the space between the taper in the union limb end and the pipe surface, the serrations on the bore of the cone bedding into the exterior pipe surface. The lip on the liner takes between the pipe end and the shoulder in the union.

I claim:

1. In a pipe coupling for metallic pipes the combination comprising, a sealing ring or thimble of metal harder than that of the pipes having a tapering outer surface with the coupling constructed so that the thinner end of the thimble is forced into a complementary recess in the union upon the tightening action, wherein the thimble is provided at least at its thinner end and on its inner surface with a number of serrations on and around said surface, the tightening up of the union resulting in the projections formed by the serrations bedding into the embraced pipe surface.

2. A sealing ring for use in a pipe coupling and as claimed in claim 1, characterised in that the serrations are formed by cutting circular V-grooves into the inner surface thereby to form circular V-section ridges around the thimble.

3. A sealing ring as claimed in claim 2, wherein the included angle of the V-section ridges is between 60° and 100°.

4. A pipe coupling or union of the type set forth, wherein each pipe receiving limb has a thickened outer end screw threaded externally to receive an internally screw threaded coupling nut, the bore of said limb being widened toward its end to receive therein the pipe end, the end of the said widened part forming a shoulder for abutment by the pipe end, the wedging member or thimble of metal harder than the limb and pipe being formed with a tapering outer surface and a cylindrical bore, with the end of the limb formed with a complementary recess to receive the thin end of the thimble, the thick or rear end of the said thimble being engaged by the inner surface of an inward circumferential flange on the coupling nut, with the inner surface or bore of the thimble formed with a plurality of circumferentially arranged V-cross-section ribs, the tightening up of the coupling nut forcing the thinner thimble end into its recess, causing the said end to grip the outer pipe surface so that the ribs bed into said surface.

5. A pipe coupling as claimed in claim 3, wherein the thick or rear end of the thimble is cut back at an acute angle of inclination with respect to the plane normal to the pipe axis and the co-operating flange face is correspondingly angled.

6. A pipe coupling as claimed in claim 4, wherein the end of the pipe within the limb is supported by a liner.

7. A pipe coupling as claimed in claim 6, wherein the liner consists of a hollow thin walled cylindrical member of an outer diameter to fit into the pipe end, said liner having an out-turned flange at its one end, which flange, after insertion of the liner into the pipe bears on the pipe end, the flange when said pipe is secured in the union taking between the shoulder and the pipe end.

FRANK KAY.

REFERENCES CITED

The following references are of record in the file of this patent:

UNITED STATES PATENTS

| Number | Name | Date |
| --- | --- | --- |
| Re. 14,077 | Hall | Feb. 29, 1916 |
| 630,047 | Gilbert | Aug. 1, 1899 |
| 657,712 | Thomas | Sept. 11, 1900 |